United States Patent Office 3,729,541
Patented Apr. 24, 1973

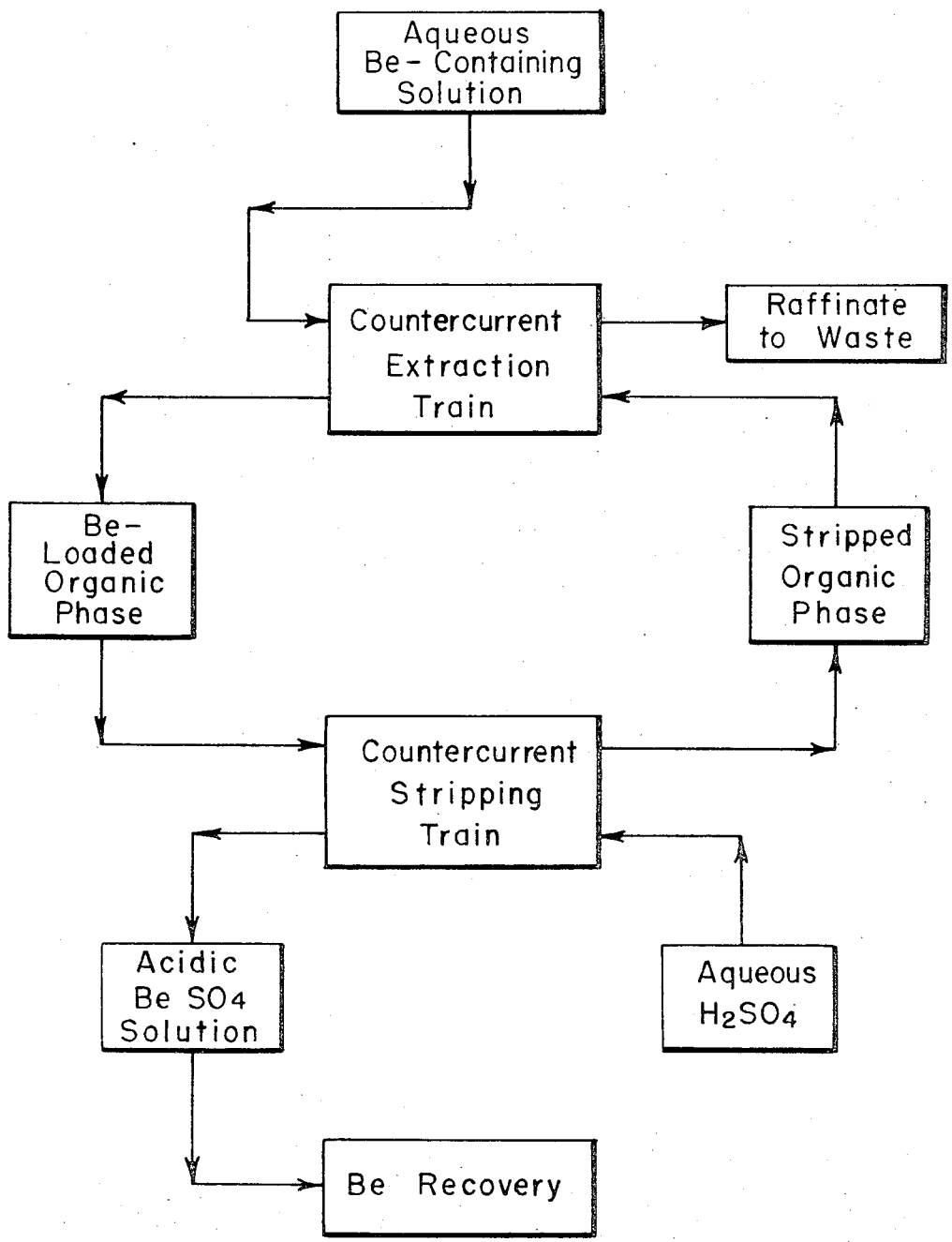

3,729,541
RECOVERY OF BERYLLIUM
James K. Grunig, Rodney J. Anderson, and Bess L. Vance, Tucson, Ariz., assignors to The Anaconda Company
Filed Nov. 30, 1971, Ser. No. 203,363
Int. Cl. C01f 3/00
U.S. Cl. 423—112                                4 Claims

ABSTRACT OF THE DISCLOSURE

Beryllium is extracted from an impure acid aqueous solution of beryllium sulfate by means of an organic solution containing a bis (alkyl substituted) phenyl acid phosphate, and then stripping the beryllium and regenerating the organic extractant by treatment of the organic solution with a mineral acid.

BACKGROUND OF THE INVENTION

Several metallurgical processes have been developed for the recovery of beryllium from its ores and other beryllium-bearing materials. Of these, the liquid-ion exchange process for the extraction and purification of beryllium has recently received a great deal of attention.

Basically, the liquid-ion exchange process can be best described as one which is performed in two parts, i.e., an extraction section and a stripping section. In the extraction section, a water-immiscible organic solvent containing an organic extractant is contacted with an aqueous solution containing the desired beryllium values. A variable number of mixing and settling operations are performed until finally the two phases (i.e., the aqueous solution phase and the organic phase containing the beryllium values) are allowed to separate. The aqueous solution which is removed from the extraction section is generally referred to as the raffinate. The organic phase containing the beryllium values and which is referred to as the loaded organic, is transferred to the stripping section of the process. In the stripping section, the beryllium values are transferred from the loaded organic to an aqueous solution for subsequent treatment to recover the beryllium. The stripped organic is recycled back to the extraction section. Occasionally, a wash section is added between the extraction and stripping sections or following the stripping section before organic recycling to the extraction section.

While the use of this type of liquid-ion exchange process in extracting beryllium from its ores has resulted in an improved method for purifying impure beryllium materials and compounds thereof, it still has presented several difficulties. For example, the organic extractants which have been used generally do not allow for a complete extraction of the beryllium values. Also the separation of beryllium from the troublesome fluoride-ion has presented numerous difficulties. In order to avoid these and other difficulties, and to effectively and completely extract the beryllium from the feed solution, it is necessary to employ organic extractants which will efficiently extract substantially all of the beryllium from the feed solution in a reasonable amount of time without having an objectionable loss of either the beryllium or the organic material.

Recently, attempts have been made to eliminate some of the operational problems which are incurred during a liquid-ion exchange process for the recovery of beryllium. U.S. Pat. No. 3,259,456 discloses the use of alkyl acid phosphates, and U.S. Pat. No. 3,131,994 specifies mono- or di-alkyl phosphoric acids, as organic extractants for recovering beryllium in a liquid-ion exchange process. While these organic extracting agents have been used commercially, they still present certain disadvantages. For example, when mixed with some of the standard solvents which are used in this type of process, some of these organic extractants have been shown to form stable emulsions which are regarded as intolerable in a liquid-ion exchange process. Also, all of these extractants are slow to load and thus increase the total time of the operation.

DESCRIPTION OF THE INVENTION

The present invention contemplates an improved process for the recovery of beryllium from an impure sulfuric acid solution containing dissolved beryllium sulfate by liquid-ion exchange. In a method for extracting beryllium by liquid-ion exchange, the beryllium is recovered by contacting a water-immiscible organic solvent containing an organic extractant with the acidic aqueous solution containing the beryllium dissolved therein. The solvent and the extractant are then mixed and allowed to settle. The resulting beryllium loaded organic phase is then separated from the aqueous phase and then the beryllium values are stripped from the organic phase. Our improvement in this process comprises using as the organic extractant a bis (alkyl substituted) phenyl acid phosphate whose alkyl substituent has a maximum chain length no greater than three carbon atoms.

A number of beryllium-bearing materials are suitable for treatment by the method of the present invention. These materials include both low and medium grade beryllium containing ores, for example, ores from the Spor Mountain Region in the United States. Beryllium is thought to occur in these ores mainly as bertrandite ($4BeO \cdot 2SiO_2 \cdot 2.8H_2O$) and/or berylliferous saponite. In contrast to bertrandite, beryl ($3BeO \cdot Al_2O_3 \cdot 6SiO_2$) and phenacite ($Be_2SiO_4$), which are other forms of naturally occurring beryllium, are not readily soluble in moderate acid concentration. However, these materials may be rendered acid soluble by such prior art processes as fluoride sintering and alkali fusion. The invention is not limited to these particular ores but includes within its scope any beryllium-bearing material which is either soluble or which may be rendered soluble in sulfuric acid to form a beryllium sulfate solution, regardless of the particular beryllium concentration.

According to the invention, the beryllium ore or other raw material containing the beryllium is first treated by any of the prior art methods to produce an aqueous sulfuric acid solution containing dissolved beryllium sulfate. This solution, which may contain a substantial amount of impurities, is the starting solution for the liquid-ion exchange process of the present invention. This aqueous solution may for example be obtained from the leachings of any of the well-known acidic leaching processes used for extracting beryllium from its respective ores.

The ion exchange extraction process may be performed in any of the conventional liquid-ion exchange apparatus, whether in single or multiple stages. While a high recovery of the beryllium may be obtained by only a single contact between the organic extractant and the feed solution, it is preferred for substantially complete recovery of the beryllium values to perform several contacts between the extractant and the feed solution in a countercurrent system. The various known techniques which are conventionally used in these liquid-ion exchange operations are also applicable to the present invention.

In the first stage of the process of the present invention, the aqueous feed solution containing the dissolved beryllium sulfate is mixed with an organic material which is used to extract the beryllium values. This organic material generally consists of an organic extractant which is dissolved in a water-immiscible organic solvent. The water-immiscible solvent may be any of several ketones; aliphatic hydrocarbon solvents, such as kerosene, light gas oils, mineral spirits, etc., aromatic solvents, such as toluene, benzene and xylene, various petroleum fractions containing a mixture of aliphatic and aromatic compounds, or a mixture of any of these solvents.

In addition, a long chain aliphatic alcohol is usually employed. The alcohol is called a co-solvent and when used it plays an active role in the solvent extraction process. Straight chain aliphatic alcohols containing six to thirteen carbon atoms are especially satisfactory co-solvents. Such co-solvents render difficultly-soluble compounds soluble in diluent solvents such as kerosene. Thus a compound such as bis-(2,4-di-tertiary butyl) phenyl acid phosphate is only difficultly soluble in kerosene at room temperature but is highly soluble in normal octanol. A mixture of bis-(2,4-di-tertiary butyl) phenyl acid phosphate, normal octanol and kerosene is prepared by dissolving the ester in the alcohol before adding the kerosene. Another function of the co-solvent which apparently is due to the polarity of the alcohol is that it promotes phase disengagement and enhances material transfer. By promotion of phase disengagement the co-solvent tends to minimize the organic content of the aqueous phase and the costs attendant to its loss from the system.

The organic extractant which is used in the present invention may be selected from any of the bis (alkyl substituted) phenyl acid phosphates having an alkyl substituent with a chain length no greater than three carbon atoms. These compounds have this general structural formula:

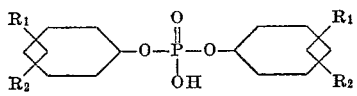

in which $R_1$ is an alkyl radical having a maximum chain length not exceeding three carbon atoms, and $R_2$ is either hydrogen or an alkyl radical having a maximum chain length not exceeding three carbon atoms. Thus $R_1$ and $R_2$ may for example be methyl, ethyl, propyl, isopropyl, isobutyl or tertiary butyl. $R_1$ and $R_2$ may be in the ortho, para, or meta positions relation to each other and to the acid phosphate nucleus. Illustrative examples of some of the organic extractants which may be used are the cresyl acid phosphates, the xylenyl acid phosphates in which the methyl groups may for example be in the 3,5 or 2,3 or 2,5 or 2,6 position, bis (di-ethyl) phenyl acid phosphates in which the ethyl groups may for example be in the 2,3 or 2,6 or 2,5 position, and di-tertiary butyl phenyl acid phosphates, for example bis (2,4-di-tertiary butyl) phenyl acid phosphate. However, any of these organic compounds whose alkyl substituents have a maximum chain length no greater than three carbon atoms may be used.

The specific concentrations of the organic extractant and solvent and the specific amount of the two materials which are used in the organic mixture in the process of course, depend upon the specific extractant and solvent combination used in the process. For example, a mixture containing 13% cresyl acid phosphate, 10% hexanol and 77% of a high flash point aromatic petroleum distillation fraction is useful. In this example, higher concentrations of cresyl acid phosphate or lower concentrations of hexanol cause some operational difficulties with emulsions.

Commercial cresyl acid phosphate is a mixture of mono-cresyl dihydrogen acid phosphate and the dicresyl mono-hydrogen acid phosphate preferred in accordance with this invention. Both of these compounds are capable of extracting beryllium from aqueous solutions, but the former is enough water-soluble so that it gradually is lost in repeated cycling of the organic extractant in contact with the aqueous phase.

The temperatures used during the extraction process and the specific time for the extraction again vary depending upon the specific organic extractant and solvent which are used in the process. Generally speaking, however, temperatures ranging from about 60° F. up to about 90° F. are employed. The amount of time for the extraction also depends on the amount of beryllium which is to remove the feed solution. Contact times generally range from about 5 to 15 minutes.

After the beryllium values have been extracted from the aqueous feed solution, the loaded organic extractant is separated from the remaining solution and then is subject to a stripping operation to obtain the desired beryllium values. This stripping operation is performed by contacting the loaded organic with a mineral acid in which the beryllium values are soluble and from which they can easily be recovered. Sulfuric acid is one of the preferred mineral acids, however, other mineral acids such as nitric, hydrochloric or hydrofluoric acid may be used. The particular stripping temperature and time of contact between the loaded organic and the stripping acid depends upon the particular organic extractant which is used in the process. However, generally speaking, temperatures of from about 60° F. to about 90° F. are used with contact times of about 5 minutes up to about 20 minutes.

After the stripping operation has been completed, beryllium may be recovered directly from the stripping solution, i.e., by precipitating the dissolved beryllium therefrom, or the beryllium values may be further purified, as for example, by subjecting the stripping solution to a crystallization process. However, any of the known processes for recovering beryllium from an acidic solution may be used.

DESCRIPTION OF THE DRAWING

Following is a detailed description of an illustrative embodiment of the invention presented with reference to the accompanying drawing, the single figure of which is a flow sheet of a specific procedure for obtaining pure beryllium values in accordance with the invention.

ILLUSTRATION PROCESS ACCORDING TO INVENTION

Referring to the drawing, the feed solution to the ion exchange extracting apparatus comprises an aqueous sulfuric acid leach solution resulting from the digestion in sulfuric acid of a ground ore containing about 1% beryllium oxide. The pH of this aqueous Be-containing solution was in the range of 3.5–3.7. A typical sampling of the solution according to the illustrative embodiment of this invention contained substantially the following:

|  | G./l. |
| --- | --- |
| BeO | 2.6 |
| $Al_2O_3$ | 1.0 |
| Fe | 0.005–0.01 |
| F | 2.5 |
| Zn | 0.0001 |
| MgO | 4.0 |
| MnO | 0.4 |
| CaO | 0.5 |

This feed solution was put into a mixer-settler extraction train of eight extraction stages and was operated using countercurrent flow. The organic material which was used for the extraction consisted of a blend of cresyl acid phosphate, hexanol, and aromatic solvent. The composition of the extractant was 10% by volume hexanol, 15% by volume bis (3,5-dimethyl) phenyl acid phosphate with the balance being an inert carrier of high flash point aromatic petroleum solvent. The operating conditions under which the extraction was performed were as follows:

|  | Stage 1 | Stage 8 |
| --- | --- | --- |
| Temperature | Ambient | Ambient. |
| Contact time | 15 minutes | 15 minutes. |
| pH | 2.5 | 1.1. |

A typical sampling of the loaded organic according to the illustrative embodiment of this invention contained substantially the following:

| | G./l. |
|---|---|
| BeO | 2.5 |
| Al$_2$O$_3$ | 0.03 |
| MgO | 0.006 |
| CaO | 0.004 |

The raffinate which goes to waste at a pH ranging from 1.0–1.1 contained substantially the following:

| | G./l. |
|---|---|
| BeO | 0.07 |
| Al$_2$O$_3$ | 1.0 |
| Fe | 0.001 |
| F | 2.5 |
| Zn | 0.0001 |
| MgO | 4.0 |
| CaO | 0.5 |

The loaded organic from the extraction operation is subject to a stripping operation in which 500 g./l. sulfuric acid was used as the stripping agent. The stripping was performed in eight stripping stages at ambient temperatures. Stripping time was about 18 minutes per stage.

After the stripping operation is completed the stripped organic is recycled to the extraction section of the operation. The extract from the stripping operation contained substantially the following:

| | G./l. |
|---|---|
| BeO | 20 |
| Al$_2$O$_3$ | 1–3 |
| Fe | 0.02–0.04 |
| F | 0.5 |
| MgO | 1.8 |
| MnO | 0.8 |

We claim:

1. In a method for the recovery of beryllium from an impure aqueous sulfuric acid solution containing dissolved beryllium sulfate by liquid-ion exchange, wherein the beryllium is recovered by contacting a water-immiscible organic solvent containing an organic extractant with the aqueous solution, mixing the solvent with the extractant and then allowing the mixture to settle, separating the resulting beryllium loaded organic from the aqueous solution, and stripping the beryllium from the loaded organic, the improvement wherein the organic extractant comprises a bis (alkyl substituted) phenyl acid phosphate having the general structural formula:

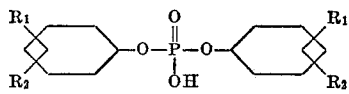

in which R$_1$ is an alkyl radical having a maximum chain length not exceeding three carbon atoms, and R$_2$ is hydrogen or an alkyl radical having a maximum chain length not exceeding three carbon atoms.

2. The process according to claim 1 wherein the organic extractant is selected from the group consisting of cresyl acid phosphates, xylenyl acid phosphates, di-ethyl phenyl acid phosphates, and di-tertiary butyl phenyl acid phosphates.

3. The process according to claim 1 wherein the water immiscible organic solvent is selected from the group consisting of toluene, benzene, kerosene, xylene, ketones, light gas oils, mineral spirits, aliphatic alcohols, and mixtures thereof.

4. The process according to claim 1 wherein the water-immiscible organic solvent contains a co-solvent selected for the group consisting of straight chain aliphatic alcohols containing six to thirteen carbon atoms.

References Cited
UNITED STATES PATENTS

| | | | |
|---|---|---|---|
| 3,131,994 | 5/1964 | Surls et al. | 423—112 |
| 3,145,081 | 8/1964 | Surls et al. | 423—112 |
| 3,259,456 | 7/1966 | Maddox et al. | 423—112 |

HERBERT T. CARTER, Primary Examiner

U.S. Cl. X.R.

75—101 BE; 23—312 ME